United States Patent [19]

Yamamoto et al.

[11] Patent Number: 5,142,728
[45] Date of Patent: Sep. 1, 1992

[54] WINDSHIELD WIPER WITH VARIABLE WIPING STROKE

[75] Inventors: Tokihiko Yamamoto, Kariya; Ryoichi Fukumoto, Nagoya, both of Japan

[73] Assignee: Aisin Seiki Kabushiki Kaisha, Kariya, Japan

[21] Appl. No.: 436,703

[22] Filed: Nov. 15, 1989

[30] Foreign Application Priority Data

Nov. 16, 1988 [JP] Japan .................. 63-287630

[51] Int. Cl.$^5$ .............. A47L 1/00; B60S 1/04
[52] U.S. Cl. .............. 15/250.13; 15/250.30; 74/522
[58] Field of Search .......... 15/250.13, 250.16, 250.17, 15/250.27, 250.30; 74/522, 42, 43

[56] References Cited

U.S. PATENT DOCUMENTS

| | | | |
|---|---|---|---|
| 2,121,233 | 6/1938 | Horton | 15/250.16 |
| 2,233,815 | 3/1941 | Horton | 15/250.16 |
| 2,298,197 | 10/1942 | Coffey | 15/250.16 |
| 3,025,552 | 3/1962 | Contant | 15/250.16 |
| 3,588,940 | 6/1971 | Mainka | 15/250.17 |
| 3,887,958 | 6/1975 | Fukasawa et al. | 15/250.17 |
| 3,942,385 | 3/1976 | Westerdale | 15/250.17 |
| 4,466,153 | 8/1984 | Seibicke | 15/250.16 |
| 4,494,421 | 1/1985 | Matuoka | 15/250.17 |
| 4,934,014 | 6/1990 | Yamamoto | 15/250.13 |

FOREIGN PATENT DOCUMENTS

| | | | |
|---|---|---|---|
| 583623 | 9/1959 | Canada | 15/250.17 |
| 911701 | 5/1954 | Fed. Rep. of Germany | 15/250.16 |
| 3607704 | 9/1986 | Fed. Rep. of Germany | 15/250.13 |
| 411012 | 6/1945 | Italy | 15/250.16 |
| 0141148 | 6/1989 | Japan | 15/250.13 |

Primary Examiner—Harvey C. Hornsby
Assistant Examiner—Gary Graham
Attorney, Agent, or Firm—Finnegan, Henderson, Farabow, Garrett & Dunner

[57] ABSTRACT

A windshield wiper structure for a vehicle which has a wiper stroke adjusting mechanism. The wiper structure includes a main lever connected through a first pin with a wiper actuating rod and secured through a second pin to the wiper arm. The wiper actuating rod drives the main lever to swing about an axis of the second pin. A first eccentric shaft is provided about the first pin and a second eccentric shaft is provided about the second pin. The first eccentric shaft is connected with the wiper actuating rod so that a rotation of the first eccentric shaft causes a relative movement between the main lever and the wiper actuating rod. A second eccentric shaft is provided about the second pin and connected through an interconnecting lever with the first eccentric shaft. A stroke adjusting mechanism is provided for effecting a rotation of the second eccentric shaft.

12 Claims, 19 Drawing Sheets

WINDSHIELD WIPER WITH VARIABLE WIPING STROKE

BACKGROUND OF THE INVENTION

1. Field of the Invention

The present invention relates to a vehicle windshield wiper, and more particularly to a windshield wiper having a variable wiping stroke.

2. Description of the Prior Art

A stroke adjustable vehicle windshield wiper has been known in the art. An example of the prior art structure is shown in FIG. 31. A wiper arm 106 carrying a wiper blade is mounted at one end on a vehicle body by means of a pin 105 for a reciprocating swinging movement and securely attached to one end of a lever 107 which is connected at the other end with one end of an actuating rod 104. A wiper driving motor is provided with an output shaft which is connected with an eccentric shaft 101. A crank lever 103 is provided to connect the other end of the actuating rod 104 with the eccentric shaft 101. The crank lever 103 is connected with the eccentric shaft 101 through a crankpin 102 which is disengageably secured to the eccentric shaft 101.

In the structure disclosed in FIG. 31, the wiper driving motor is operated to rotate the eccentric shaft 101 with the crankpin 102 engaged with the eccentric shaft 101 to securely connect the crank lever 103 to the eccentric shaft 101. The rotation of the eccentric shaft 101 causes the end of the crank lever 103 which is connected to the actuating rod 104 to rotate along a path which is shown by a broken line in FIG. 31. Thus, the rod 104 is moved to reciprocate in a substantially axial direction causing the lever 107 and the wiper arm 106 to swing about the pin 105. When it is desired to place the wiper blade in a park position, the crank pin 102 is disengaged from the eccentric shaft 101 and moved to the position shown by 102a in FIG. 31 to be secured to the shaft 101 again at this position. The end of the lever 103 which is connected to the rod 104 is then shifted to the position shown by A in FIG. 31 so that the wiper arm 106 is placed at a park position beyond the wiping stroke range.

It should however be noted that the prior art structure discussed above can provide the wiper park position outside the wiper stroke but it cannot change the wiping stroke during operation of the wiper. When the vehicle windshield wiper is being operated while the vehicle is running, the wiper blade is subjected to a wind force which tends to move the wiper blade beyond a desired wiping stroke. Such wind force sometimes cause the wiper blade to hit the front pillar of the vehicle or in a worst case to move beyond the front pillar. It should further be noted that the wind force on the wiper blade is transmitted through the actuating mechanism to the wiper motor so that the wiper driving structure must be such that it can overcome the wind force acting on the wiper blade. For this reason, a bulky worm gear mechanism has been required.

SUMMARY OF THE INVENTION

It is therefore an object of the present invention to provide a vehicle windshield wiper structure which can eliminate the aforementioned problems in the prior art wiper structure.

Another object of the present invention is to provide a vehicle windshield wiper structure in which the wiping stroke of the wiper blade can be adjusted while the wiper is being operated.

A further object of the present invention is to provide a wiper structure in which the wiping stroke can be steplessly changed.

According to the present invention the above and other objects can be accomplished by providing a vehicle windshield wiper structure with stroke adjusting means. More specifically, the wiper structure of the present invention includes wiper arm means mounted on a stationary part for a reciprocating swinging movement. Wiper actuating means is provided and connected with the wiper arm means so as to cause the reciprocating swinging movement of the wiper blade means. Between the wiper actuating means and the wiper arm means, there is provided wiper stroke adjusting means including eccentric shaft means provided on one of the wiper actuating means and the wiper arm means and receptacle means provided on the other of the wiper actuating means and the wiper arm means for engaging with the eccentric shaft means, and stroke changing means for rotating the eccentric shaft means with respect to the receptacle means.

According to a specific feature of the present invention, the eccentric shaft means is provided on the wiper arm means and the wiper arm means is provided with a first lever which is pivotable on the wiper arm means and connected to the eccentric shaft means so that the eccentric shaft means can be rotated with respect to the wiper arm means to change the relative position between the wiper arm means and the wiper actuating means. Motor means may be provided to effect a rotation of the first lever means. According to a preferable feature of the present invention, the eccentric shaft means is provided with a second lever and a connecting lever is provided to connect the first and second levers.

The above and other objects and features of the present invention will become apparent from the following description of preferred embodiments taking reference to the accompanying drawings.

BRIEF DESCRIPTION OF THE DRAWINGS

FIGS. 9, 11, 13, 1, 17, 19, 21, 23 and 25 are plan views, respectively, of the mechanism shown in FIGS. 8, 10, 12, 14, 16, 18, 20, 22 and 24;

DESCRIPTION OF THE PREFERRED EMBODIMENT

Figure 2:
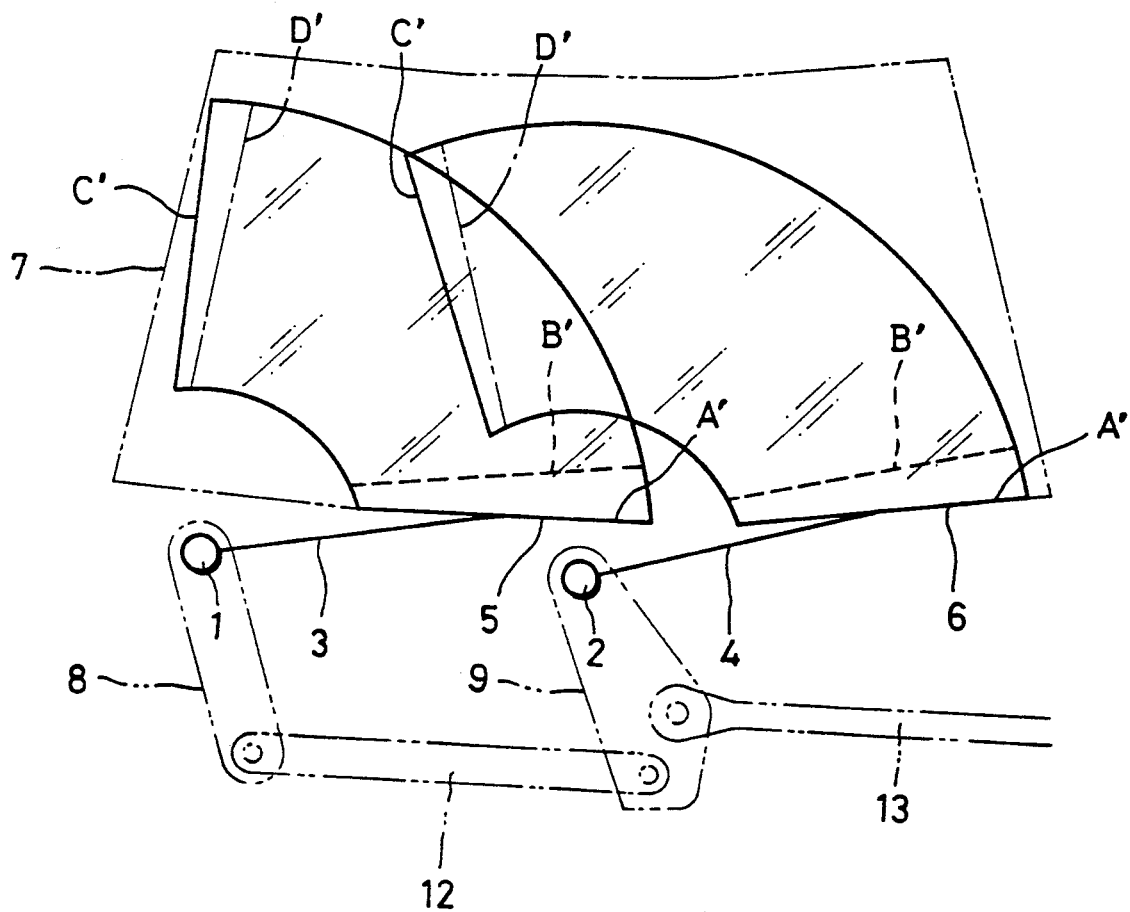
FIG. 2 is a front view showing in general the wiper structure to which the present invention is applied.
Figure 3:
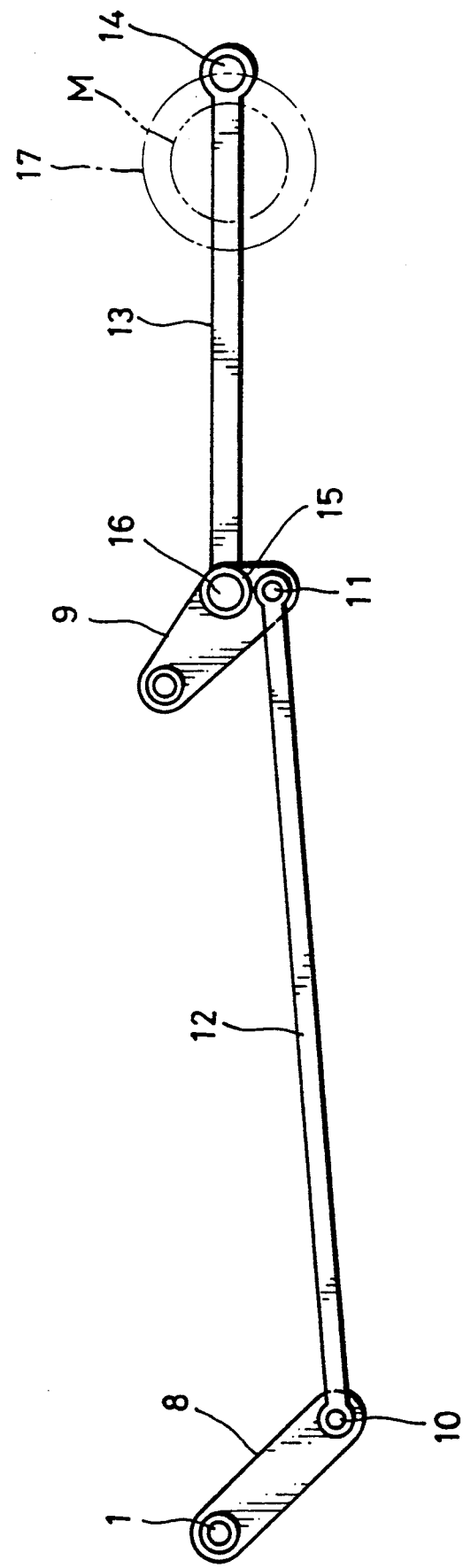
FIG. 3 is a view showing a part of the wiper stroke adjusting mechanism.

Referring to the drawings, particularly to FIGS. 2 and 3, there is shown a windshield wiper structure which includes a pair of wiper blades 5 and 6 connected respectively with wiper arms 3 and 4. The wiper arms 3 and 4 are respectively mounted on a stationary part of a vehicle body by means of pins 1 and 2, respectively, for swingable movements. The wiper arms 3 and 4 are secured to one ends of main levers 8 and 9, respectively, which are interconnected each other by a connecting link 12. The main lever 9 is connected at an intermediate position with one end of an actuating rod 13. A wiper driving motor M is provided and has an output shaft provided with a crankarm connected with the other end 15 of the actuating rod 13 by means of a pin generally designated by the reference numeral 16.

In the structure described above, the motor M drives the actuating rod 13 through the crankarm so that the end of the actuating rod connected with the crankarm of the motor M is moved along a circular path 17. The actuating rod 13 is therefore reciprocated substantially in the axial direction to cause swingable movements of the main levers 8 and 9. Thus, the wiper arms 3 and 4 and therefore the wiper blades 5 and 6 are swingably moved to wipe the windshield which is designated by a reference numeral 7. Referring to FIG. 2, the wiper stroke is shown as having a lower stroke end B' and an upper stroke end C'. Further, the wiper has a park position which is shown by a reference character A'. As an alternative, there is a second upper stroke end D'.

Figure 1:
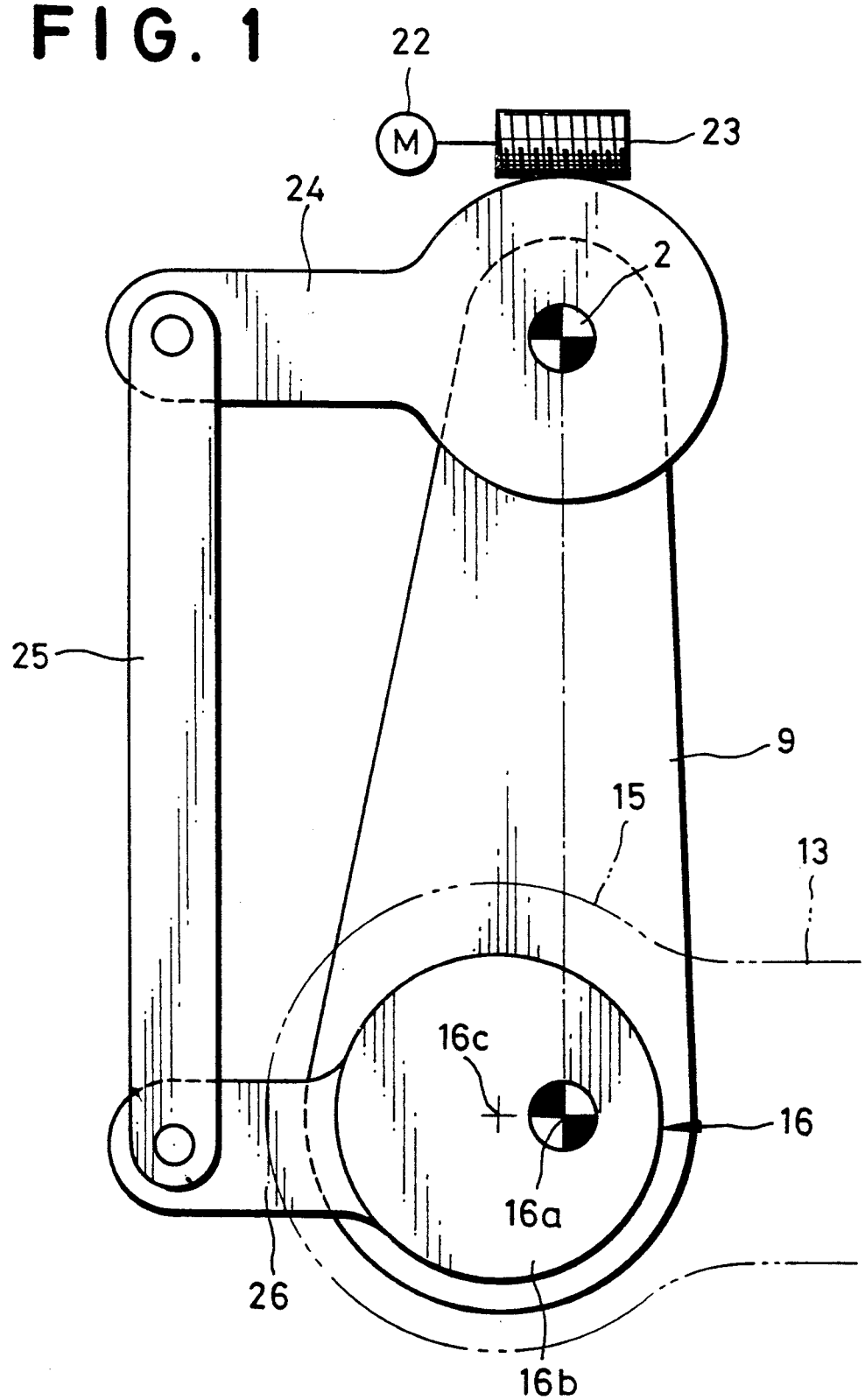
FIG. 1 is a front view of a part of the wiper stroke adjusting mechanism in accordance with one embodiment of the present invention.

In order to make the wiper stroke adjustable, there is provided a stroke adjusting mechanism on the main lever 9. Referring to FIG. 1 as well as FIGS. 4 and 5, the intermediate position of the main lever 9 is connected with the actuating rod 13 through an eccentric shaft portion 16b of the pin 16. The eccentric shaft portion 16b has an eccentric axis 16c and 16 is provided on the main lever 9 for rotation about a first axis 16a. The actuating rod 13 is provided with a circular socket 15 which is fitted to the eccentric shaft portion 16b 16.

Figure 4:
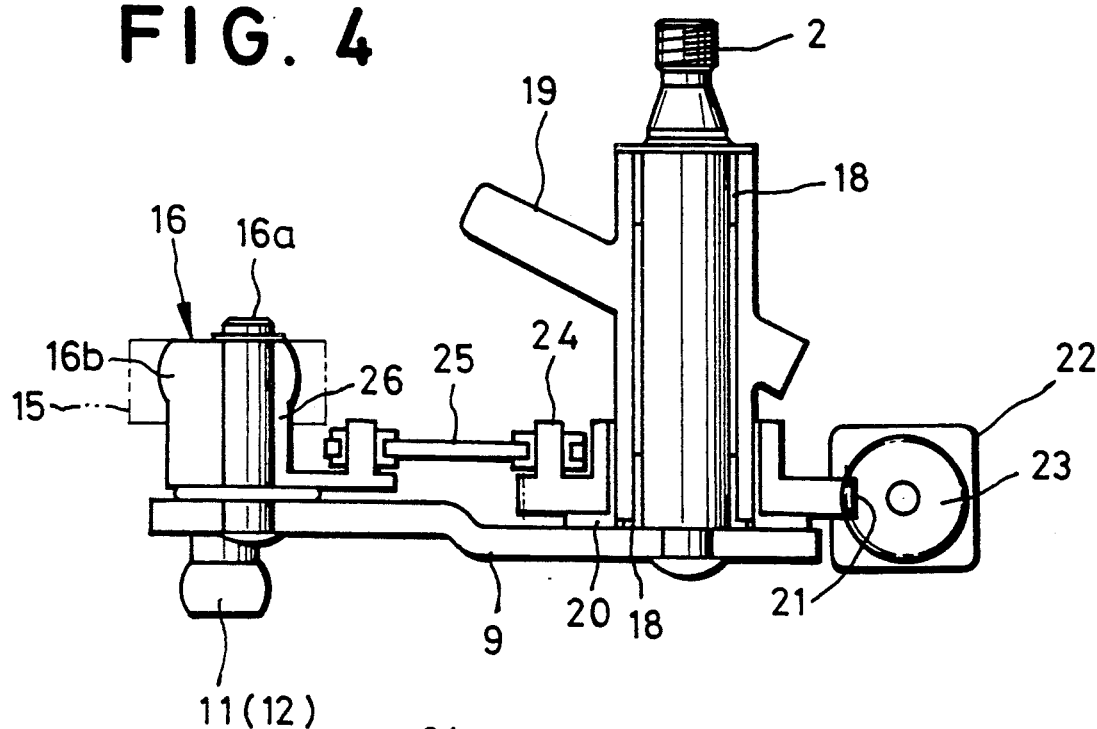
FIG. 4 is a sectional view of the mechanism shown in FIG. 1.

In FIG. 4, it will be noted that the pin 2 is mounted on the vehicle body 19 through bearing bushes 18. On the pin 2 which mounts the wiper arm 4 and the main lever 9 on the vehicle body 19, there is provided a worm wheel 21 which is rotatably carried on the vehicle body 19 by means of a bearing bush 20. The worm wheel 21 has a first adjusting lever 24 which is swingable about the pin 2. The eccentric shaft 16 is formed with an extension arm 26 which extends substantially in parallel with the first adjusting lever 24. A connecting link 25 is provided to connect the free ends of the lever 24 and the arm 26. A stroke changing motor 22 is provided and has an output shaft secured to a worm 23. The worm 23 is in meshing engagement with the worm wheel 21 on the adjusting lever 24.

It will be understood in the structure described above that the motor 22 is operated to swingably move the lever 24 so that the free end of the lever 24 is moved along an arcuate path having a center of arc at the axis of the pin 2. The swinging movement of the lever 24 is transmitted to the arm 26 to cause a rotation of the eccentric shaft about the axis 16a. Thus, the center 16c of the eccentric portion 16b of the eccentric shaft 16 is shifted along a circular path about the axis 16a to change the relative position between the main lever 9 and the actuating rod 13. As the result, the position of the wiper arm 4 and the wiper blade 6 can be changed with respect to a specific operating phase of the wiper motor M.

Figure 5:
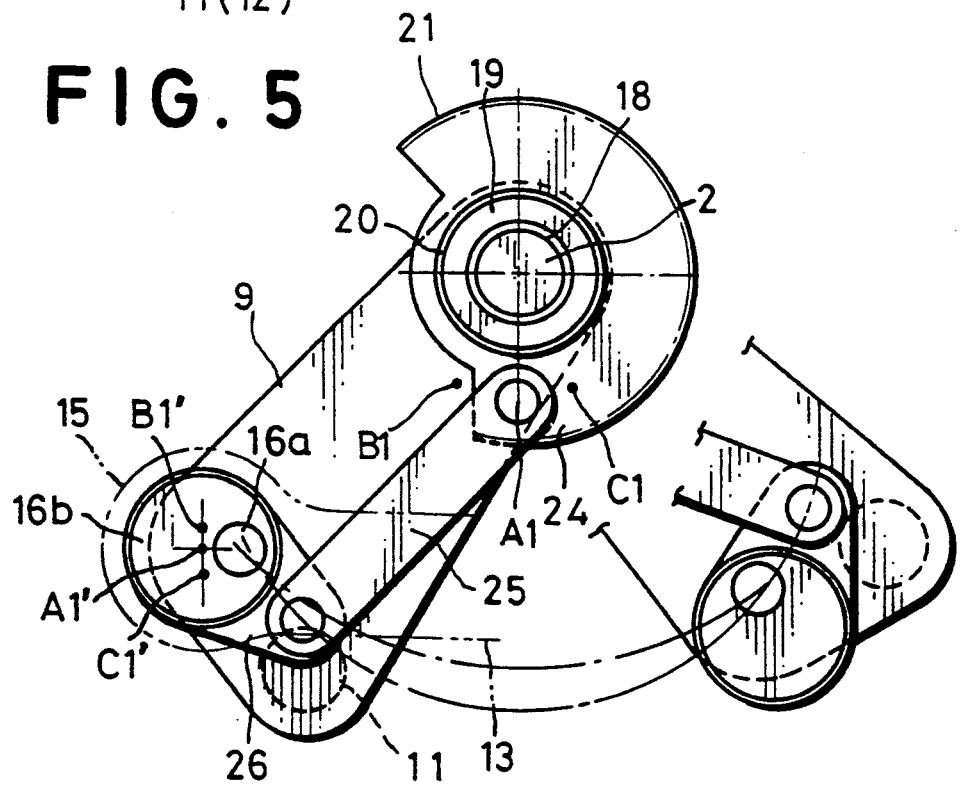
FIG. 5 is a plan view of the mechanism shown in FIG. 5.

FIG. 1 is drafted to show only the general principle of the wiper stroke adjustment. Therefore, the specific arrangements of the structure in FIGS. 4 and 5 are different from those illustrated in FIG. 1. It is possible by an appropriate operation of the stroke adjusting motor 22 to determine the wiper stroke at either of the upper stroke limits C' and D' and at the lower stroke limit B'. It is further possible to locate the wiper blade 6 at the park position A' through an appropriate operation of the motor 22. For example, when the connection between the lever 24 and the connecting lever 25 is at the position A1 as shown in FIG. 5, the center of the eccentric portion 16b of the eccentric shaft 16 is located at a position shown by A1' and the wiper stroke may be as shown by D' in FIG. 2. However, if the connection between the lever 24 and the connecting link 25 is shifted to a position shown by B1 in FIG. 5, the center 16c of the eccentric portion 16b of the eccentric shaft 16 is shifted to the position shown by B1' so that the wiper stroke may be changed to that shown by C' in FIG. 2. When the connection is shifted to a position shown by C1 in FIG. 5, the center 16c of the eccentric portion 16b of the eccentric shaft 16 is shifted to a position shown by C1' so that the wiper blade 6 may be positioned at a park position.

Figure 6:
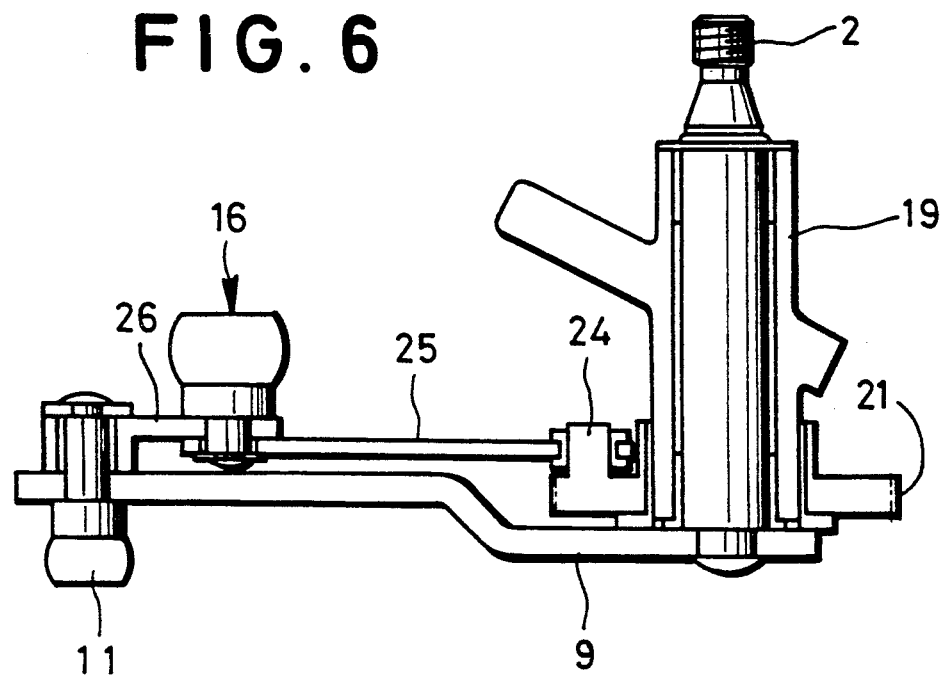
FIG. 6 is a sectional view similar to FIG. 4 but showing another embodiment of the present invention.
Figure 7:
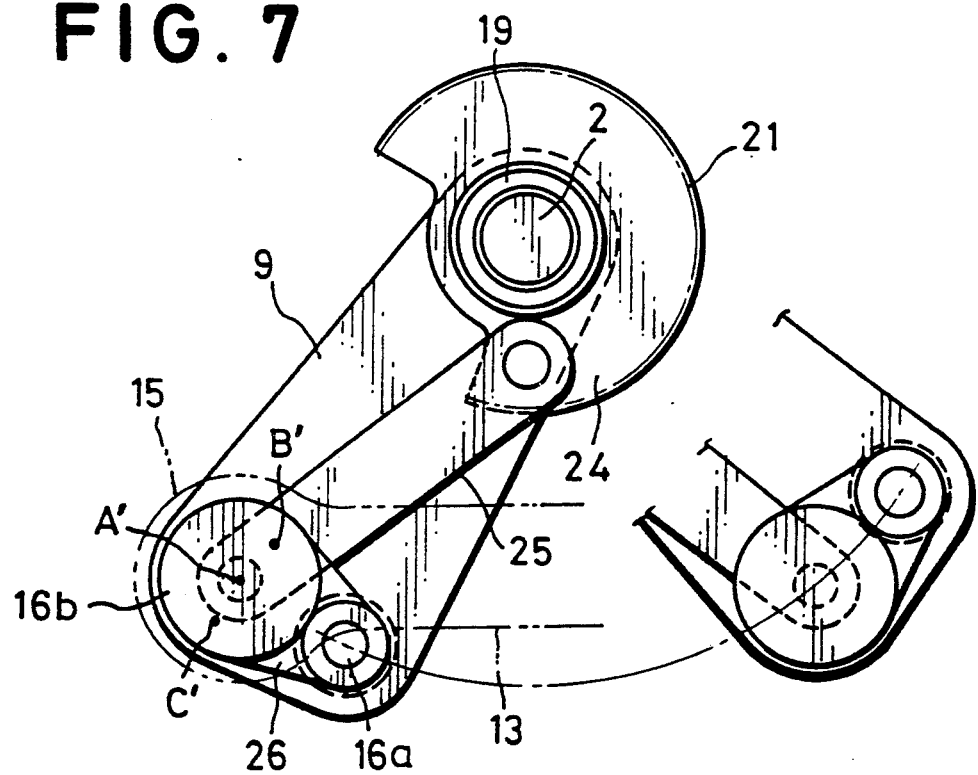
FIG. 7 is a plan view of the mechanism shown in FIG. 6.

Referring to FIGS. 6 and 7, the embodiment shown therein is different from the previous embodiment in that the eccentric shaft 16 is made of a pin 16a rotatably mounted on the main lever 9 and an eccentric pin 16b connected with the pin 16a through a lever 26. The eccentric pin 16b receives the receptacle 15 provided on the actuating rod 13. The connecting link 25 is connected at one end with the lever 24 on the worm wheel 21 and at the other end with the eccentric pin 16b. The operation of this embodiment is the same as that of the previous embodiment.

Figure 8:
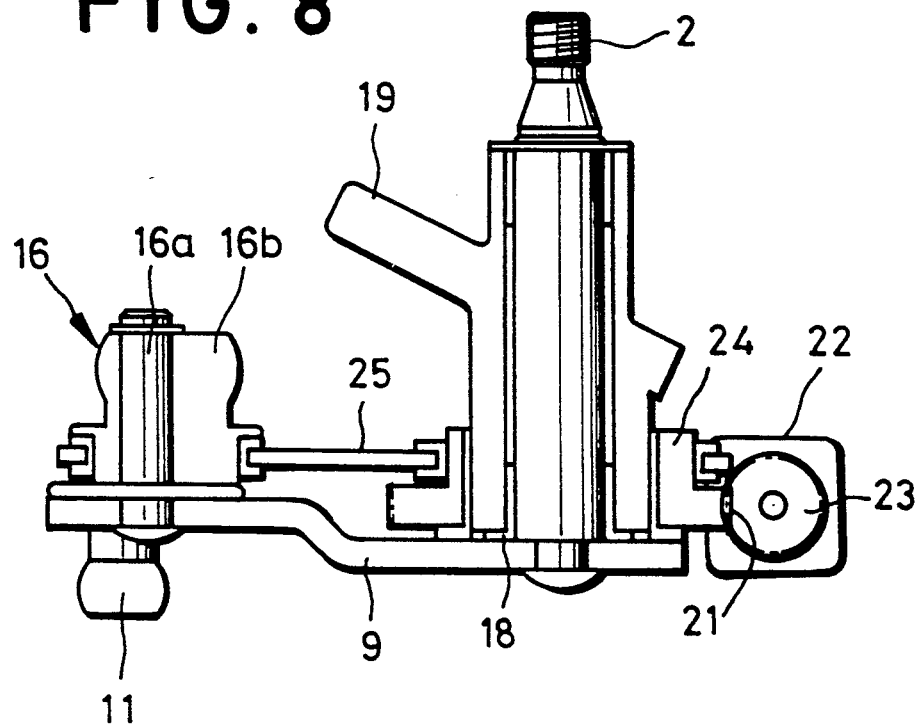
FIGS. 8, 10, 12, 14, 16, 18, 20, 22 and 24 are sectional views similar to FIG. 4 but showing further embodiments.
Figure 9:
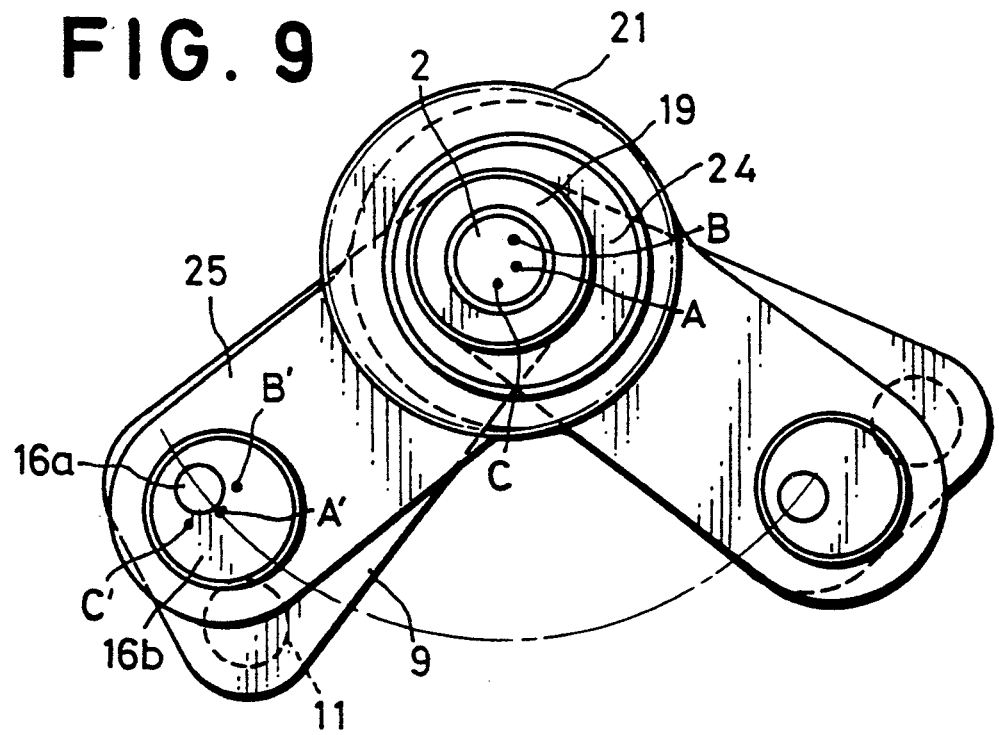

Referring now to FIGS. 8 and 9, there is shown another embodiment of the present invention. In this embodiment, the worm wheel 21 mounted on the pin 2 is provided with a cam 24 and one end of the connecting link 25 is engaged with the cam 24. The other end of the connecting link 25 is connected with the eccentric portion 16b of the eccentric shaft 16. A rotation of the worm wheel 21 therefore causes a swingable movement of the connecting lever 25 to change the relative position of the main lever 9 with respect to the actuating rod 13. The embodiment is considered advantageous in that the connecting link 25 can be connected with the cam 24 and the eccentric shaft 16 with increased bearing areas. It is possible to produce the worm wheel 21 and the cam 24 integrally from a plastic material to decrease the gear noise. It is also possible to provide the connecting lever with a sufficient width to withstand a possible heavy load which may be incurred on the wiper motor in removing snow on the windshield.

Figure 10:
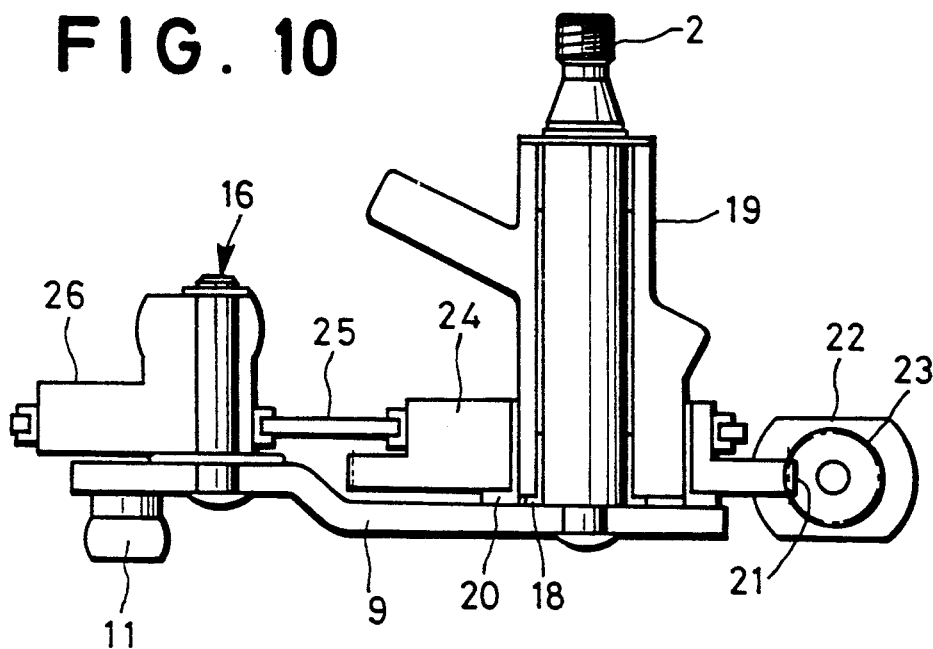
Figure 11:
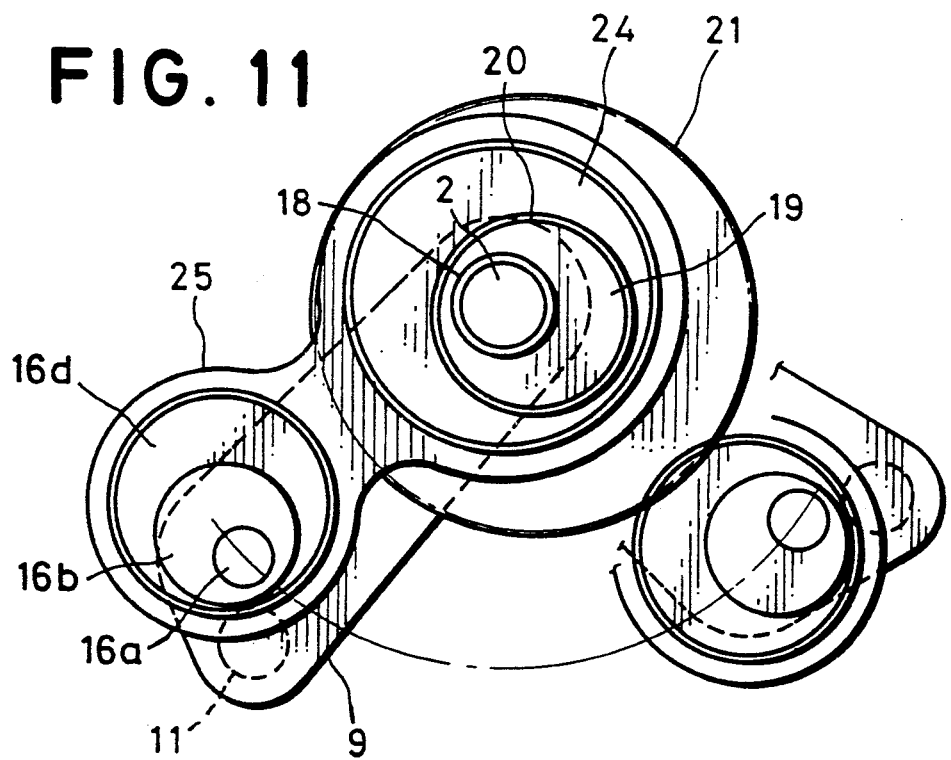

Referring now to FIGS. 10 and 11, there is shown a further embodiment of the present invention which includes an eccentric shaft 19a which is provided on the vehicle body 19. In the eccentric shaft 19a, there is located the pin 2. The worm wheel 21 is mounted on the eccentric shaft 19a and has a cam 24. The eccentric shaft 16 has a pin 16a mounted on the main lever 9 and a first eccentric portion 16b engaged with the socket 15 at one end of the actuating rod 13. The eccentric shaft 16 further has a second eccentric portion 16d which is engaged with the connecting lever 25. In other respects, the arrangements are the same as those in the embodiment shown in FIGS. 8 and 9.

This embodiment is considered advantageous in that the reaction force produced in the connecting link 25 in response to an axial force in the actuating rod 13 can be decreased as compared to those in the previous embodiments. It is therefore possible to make the connecting link 25 thinner than in those in the previous embodiment.

Figure 12:
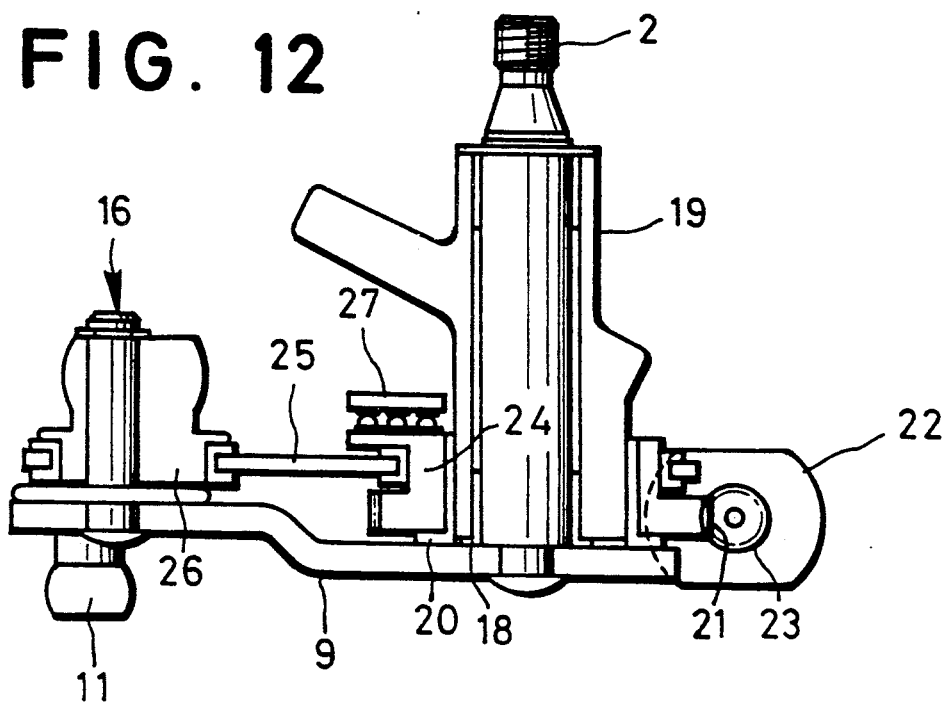
Figure 13:
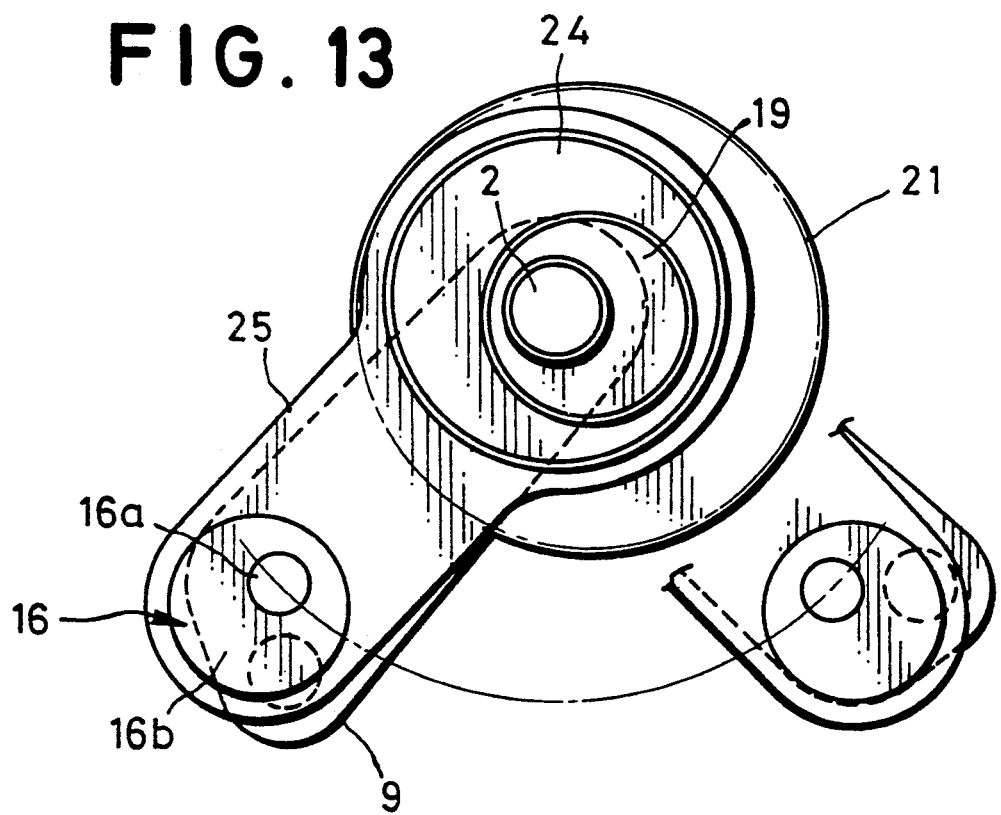

In FIGS. 12 and 13, there is shown a further embodiment of the present invention. In this embodiment, the eccentric shaft 16 is of a type having only the pin 16a and the first eccentric portion 16b. In other respects, the arrangements are the same as those in the embodiment shown in FIGS. 10 and 11. This embodiment may be modified by substituting the cam 24 by the arm 24 formed on the worm 21 as shown in FIG. 5.

Figure 14:
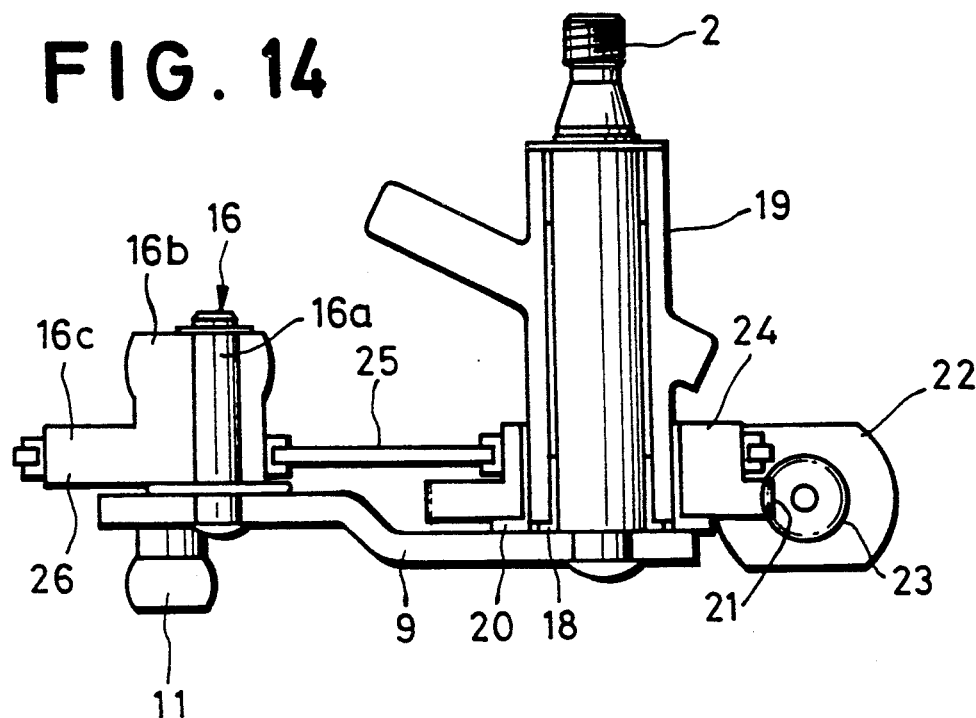
Figure 15:
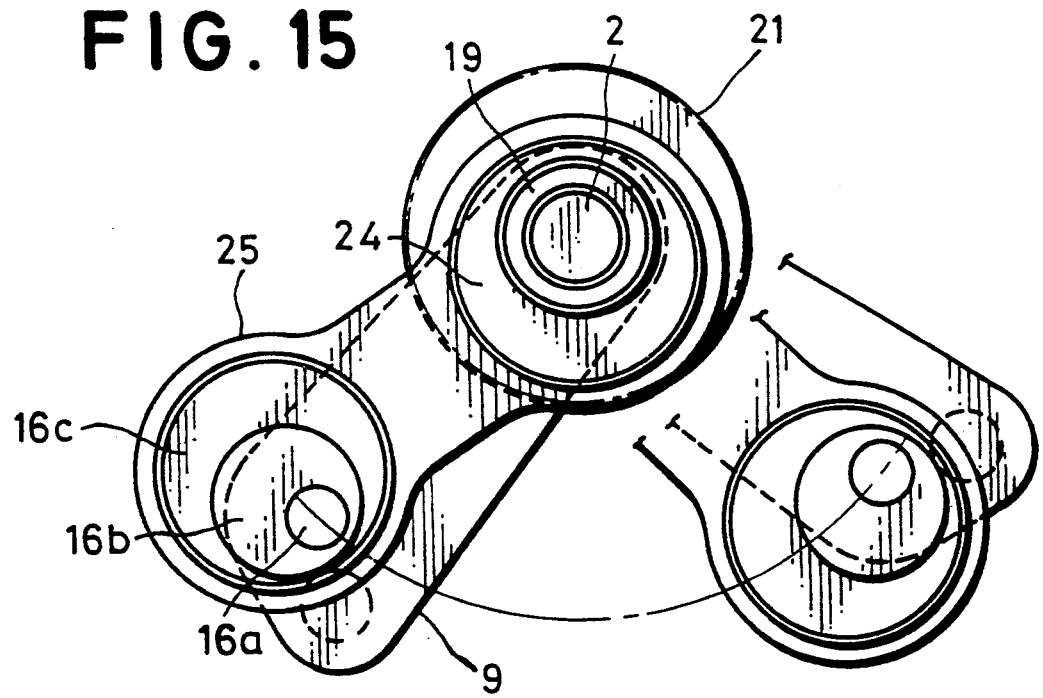
Figure 16:
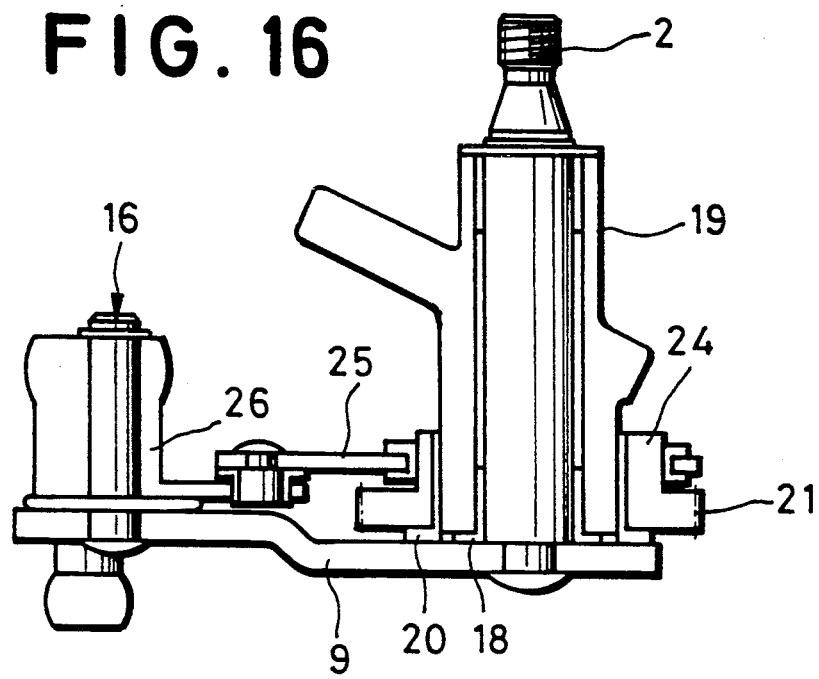
Figure 17:
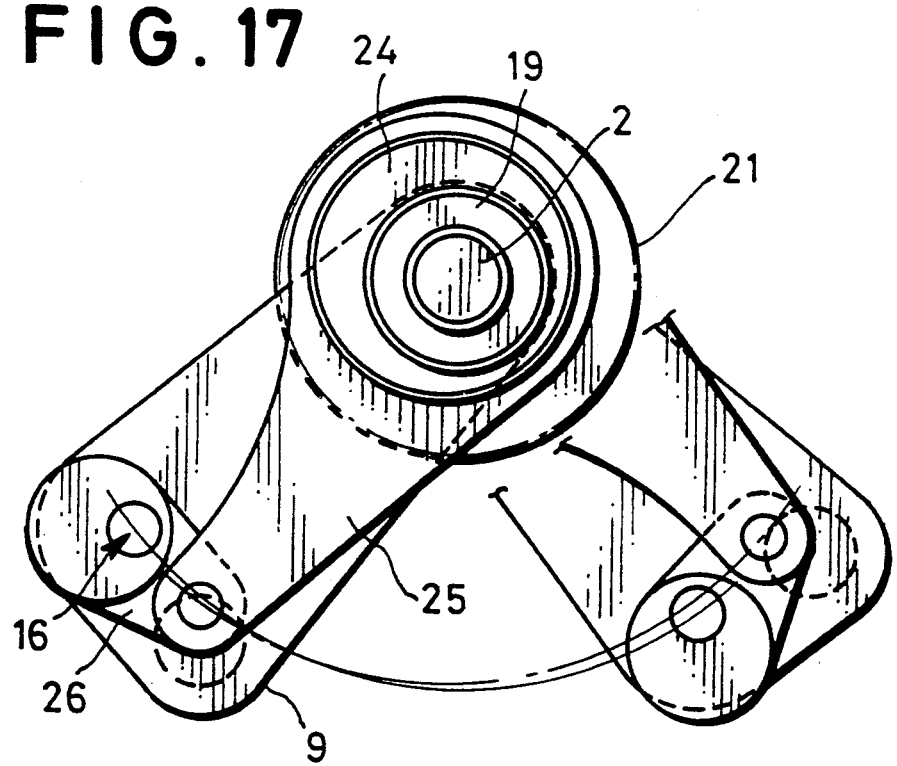

In FIGS. 14 and 15, there is shown a further embodiment of the present invention. In this embodiment, the connecting link 25 is connected with a cam 24 which is similar to that in the embodiment of FIGS. 8 and 9. The other end of the connecting link 25 is connected with a second eccentric portion 16c of an eccentric shaft 16 which is similar to that shown in FIG. 11. There is shown a further modification in FIGS. 16 and 17. In this structure, the connecting link 25 is connected at one end with a cam 24 as in the embodiment of FIGS. 8 and 9. The other end of the connecting link 25 is connected with one end of a lever 26 provided on the eccentric shaft 16 as in the embodiment of FIGS. 4 and 5.

Figure 18:
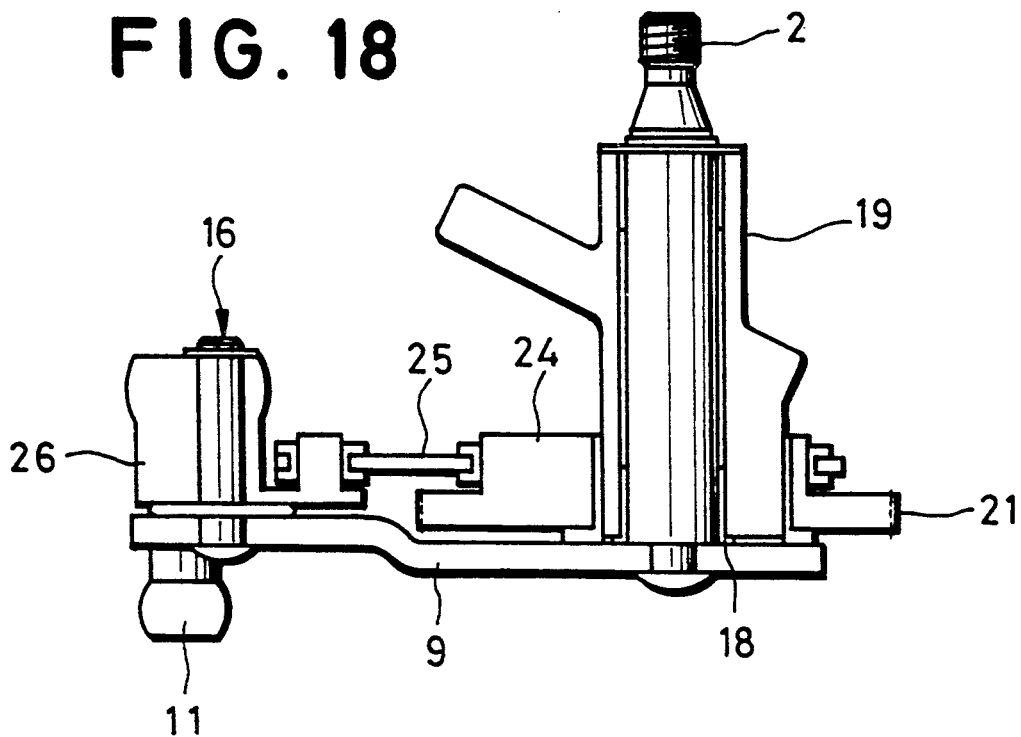
Figure 19:
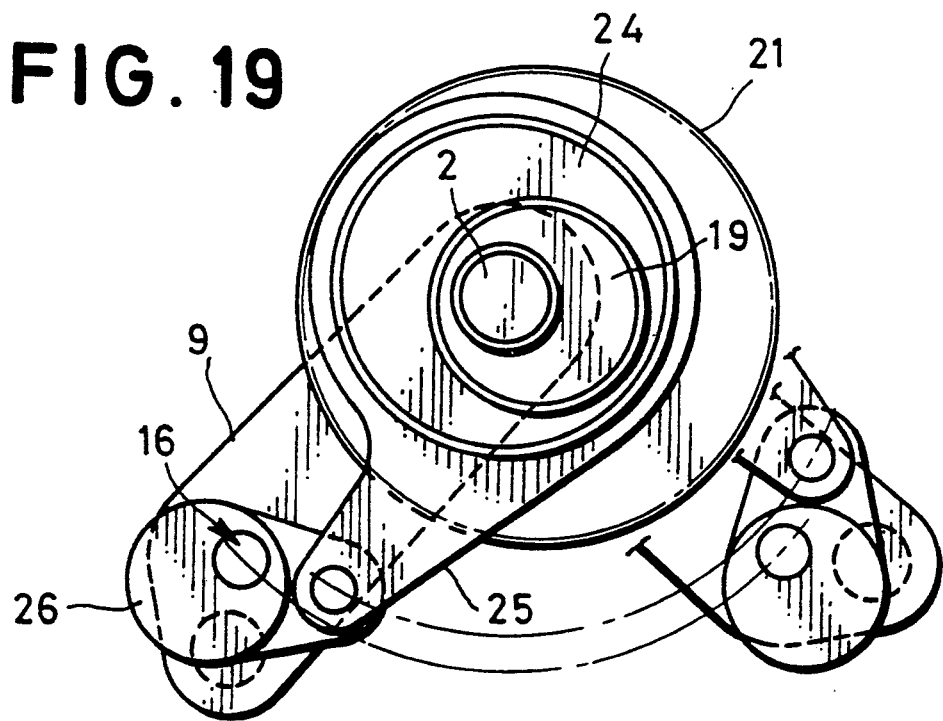

Referring to FIGS. 18 and 19, there is shown a further modification in which the connecting link 25 is connected with a cam 24 which is similar to that in the embodiment of FIGS. 10 and 11. The other end of the connecting link 25 is connected with an arm 26 which is similar to that in the embodiment of FIGS. 4 and 5. The arrangements of FIGS. 16 through 19 are advantageous in that manufacturing errors can be compensated for by the connection between the arm 26 and the connecting link 25.

Figure 20:
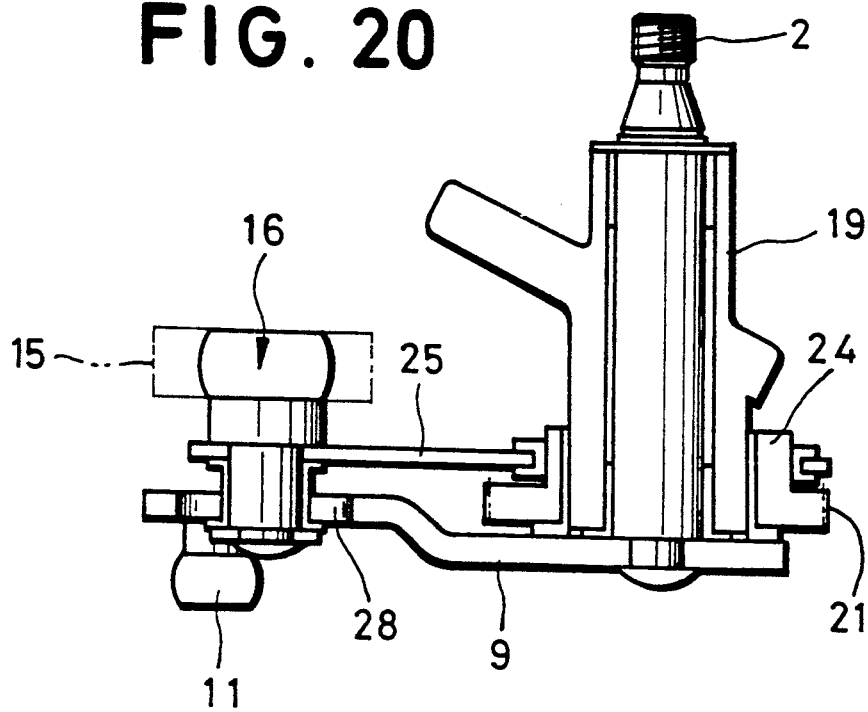
Figure 21:
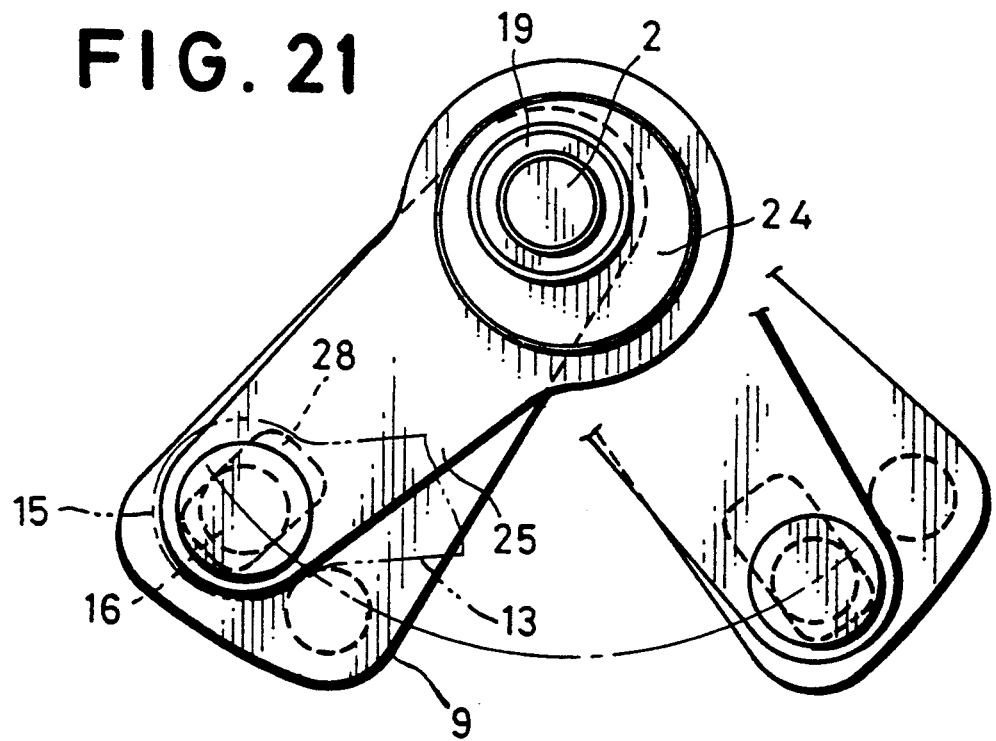

Referring now to FIGS. 20 and 21, there is shown a further embodiment of the present invention. In this embodiment, the connecting link 25 is engaged at one end with a cam 24 provided on the worm 21. Adjacent to the other end of the connecting link 25, there is formed an elongated slot 28. A pin 16 provided on the connecting link 25 is engaged with the slot 28. Further, a receptacle 15 at one end of the actuating rod 13 is fitted to the pin 16. When the worm wheel 21 is rotated, the connecting link 25 is swingably moved through the action of the cam 24. The pin 16 at the end of the link 25 is slidably moved in the slot 28 and as the result relative position of the main lever 9 and the actuating rod 13 can be changed.

Figure 22:
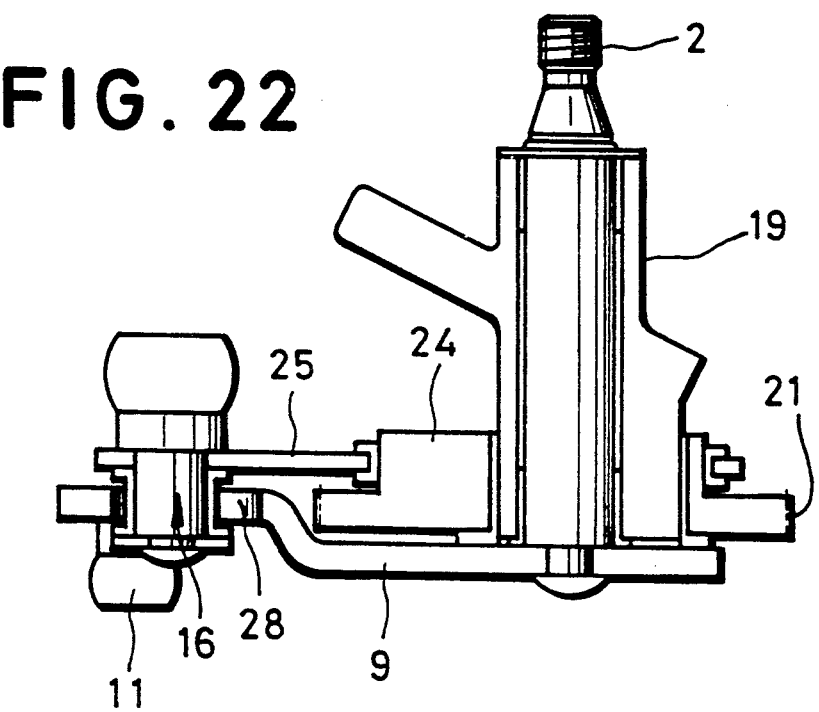
Figure 23:
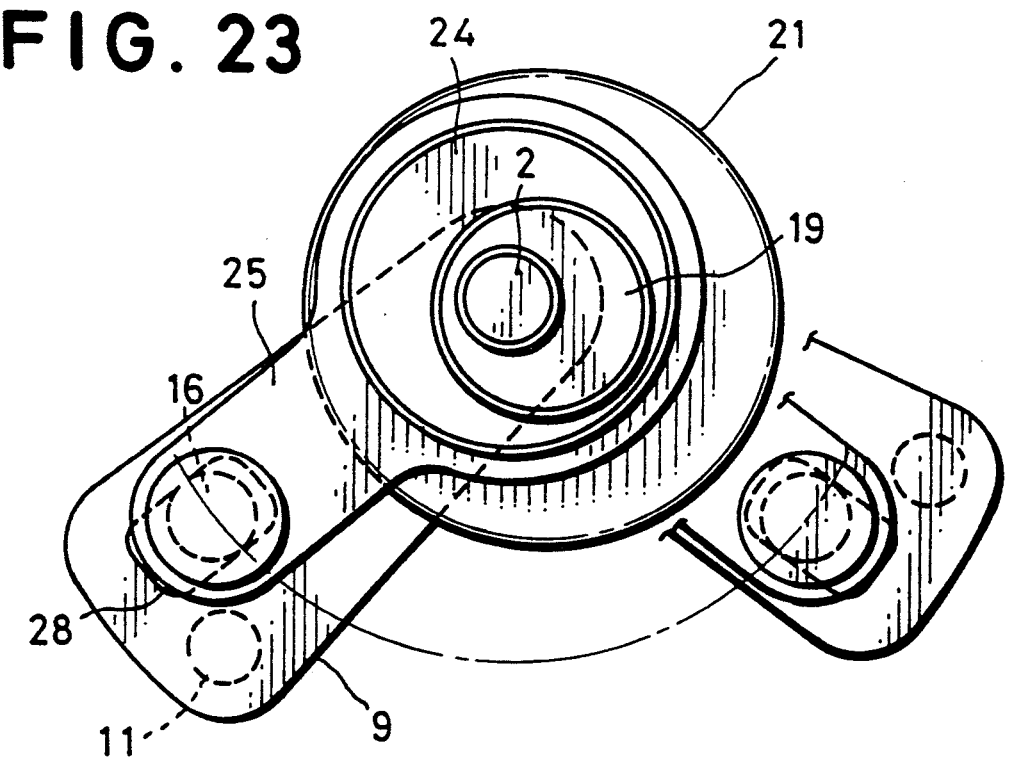
Figure 24:
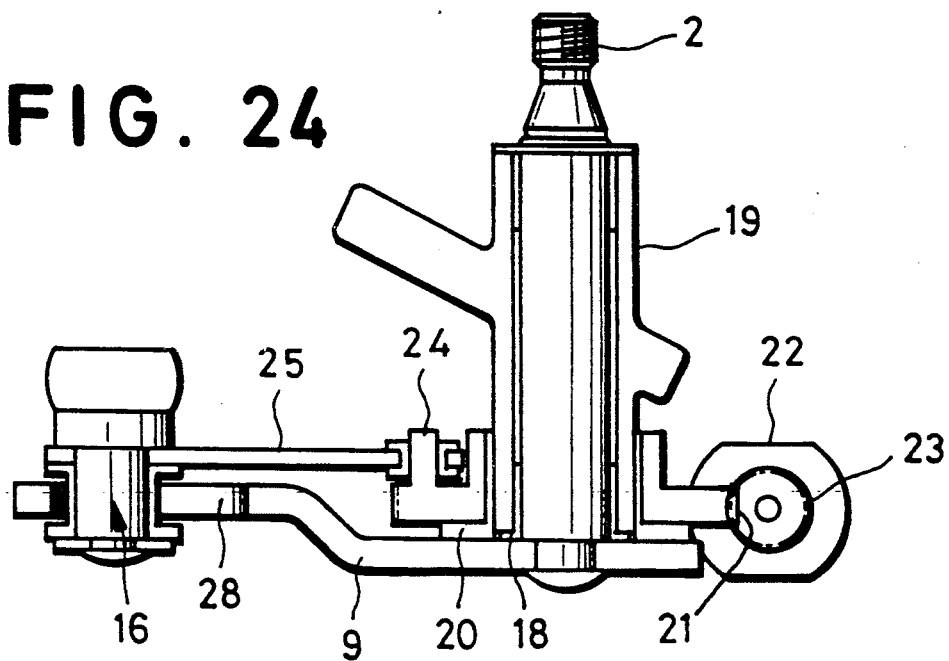
Figure 25:
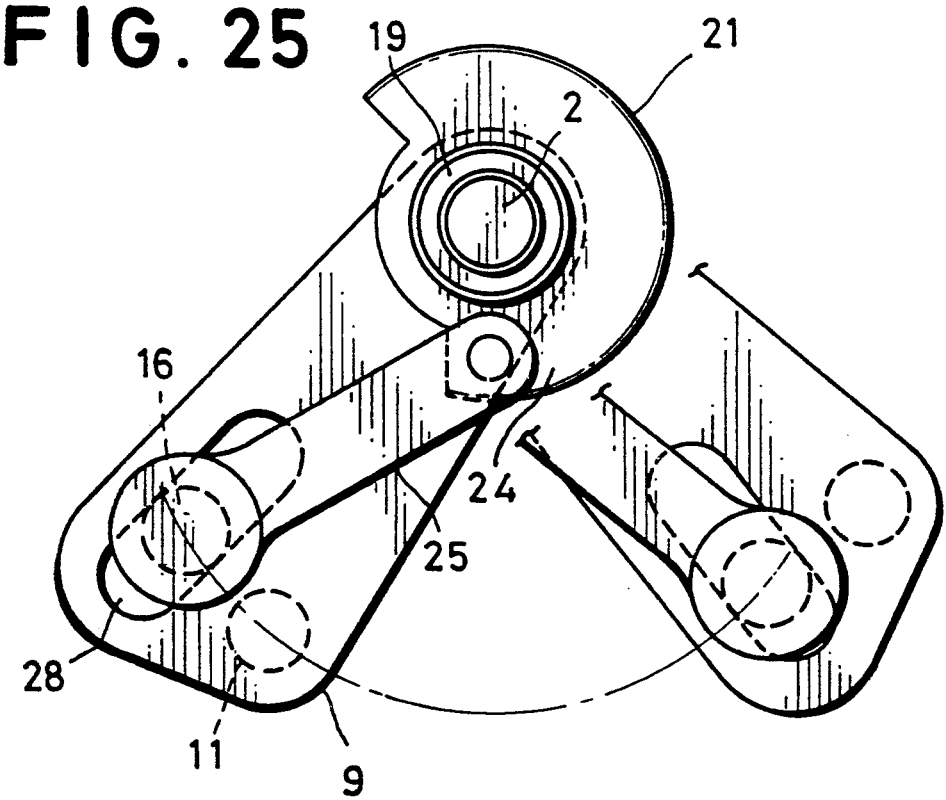

Referring to FIGS. 22 and 23, the structure shown therein is different from the structure in FIGS. 20 and 21 in that the connecting link 25 is mounted on a cam 24 provided on an eccentric shaft 19a on the vehicle body 19 as in the embodiment of FIGS. 10 and 11. In FIGS. 24 and 25, there is shown a modification of the structure. In this arrangement, the connecting link 25 is connected with a lever portion 24 of a worm 21 as in the embodiment of FIGS. 4 and 5. In other respects, the arrangements are the same as those in FIGS. 20 and 21.

Figure 26:
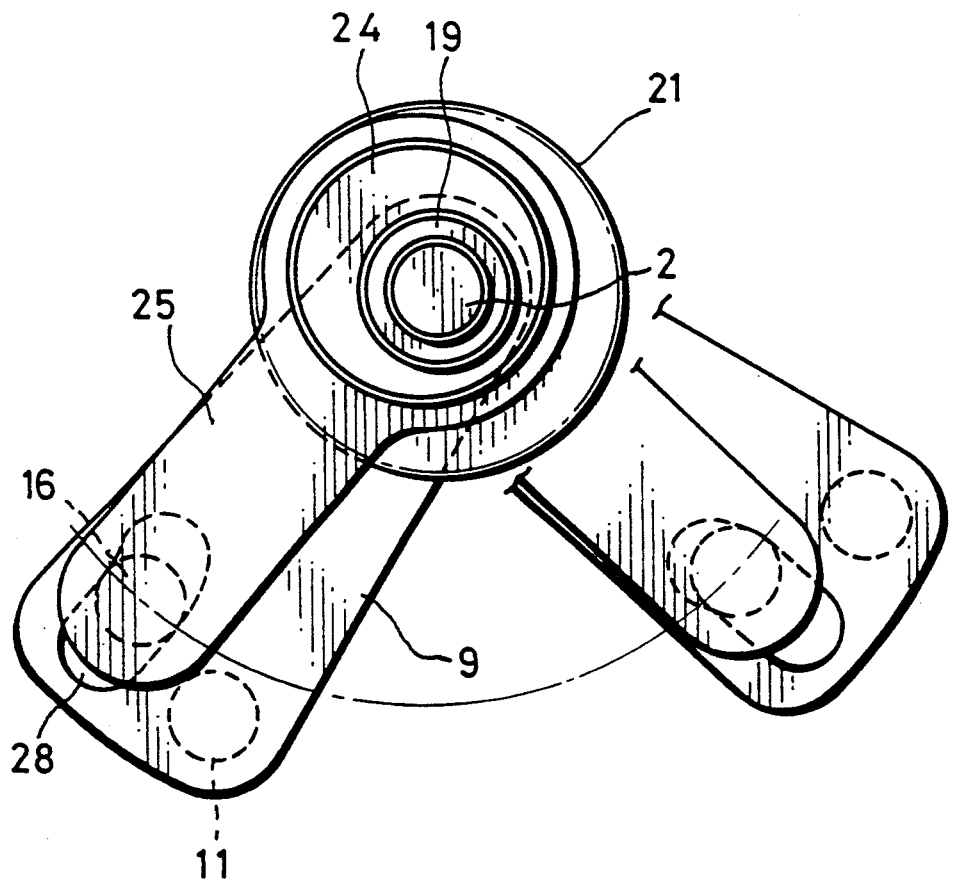
FIG. 26 is a plan view showing a further embodiment of the present invention.

The arrangements shown in FIGS. 20 through 25 are considered advantageous in that manufacturing errors can be absorbed at the engagement between the pin 16 and the slot 28. It is therefore possible to ensure a smooth operation of the mechanism. Referring to FIG. 26, the arrangement shown therein is different from that show in FIGS. 20 and 21 in that the connecting link 25 is engaged with a cam 24 as in the embodiment of FIGS. 8 and 9. This structure may further be modified by substituting the cam 24 by a worm and lever structure as shown in FIG. 5 or by a cam as shown in FIG. 11.

Figure 27:
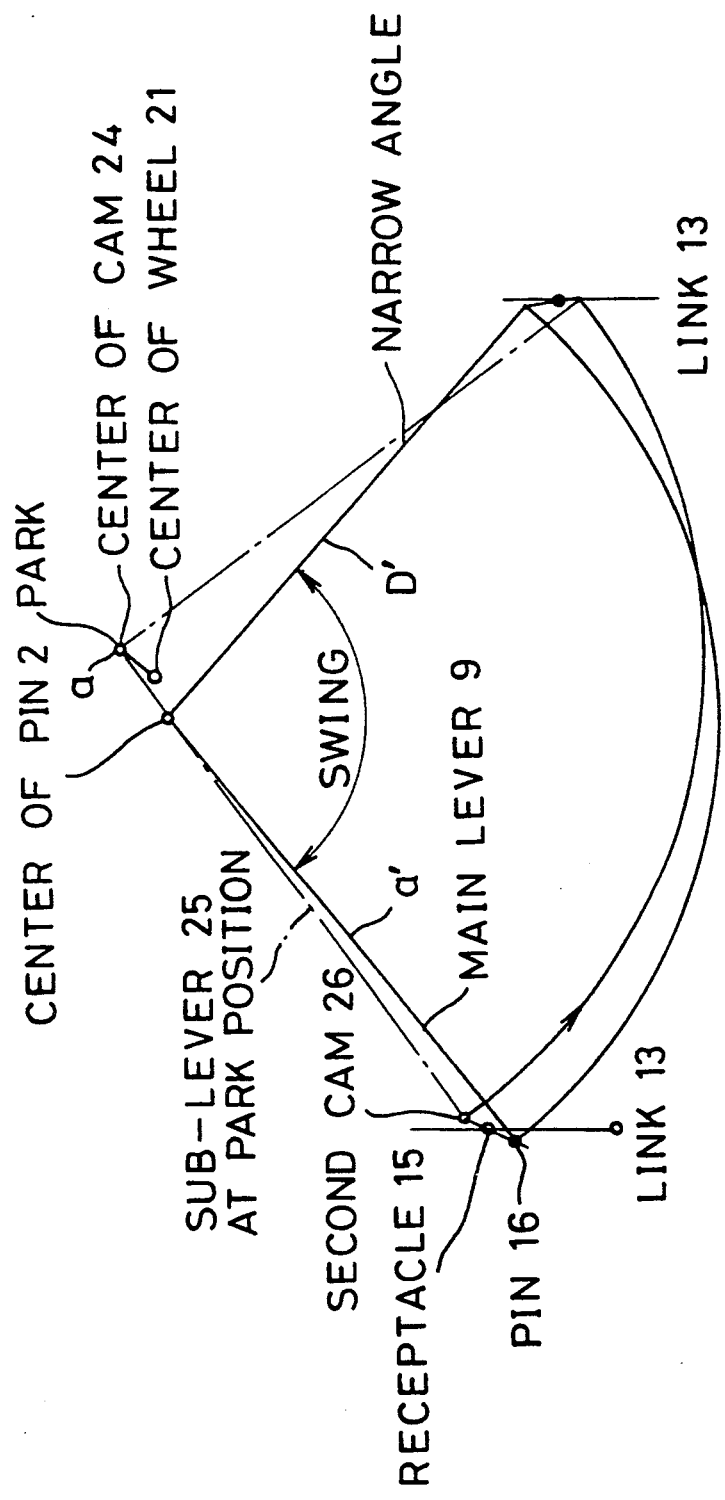
FIGS. 27 through 30 show operation of the stroke adjusting mechanism of the present invention; and, FIG. 31 is a front view showing an example of a conventional structure.
Figure 28:
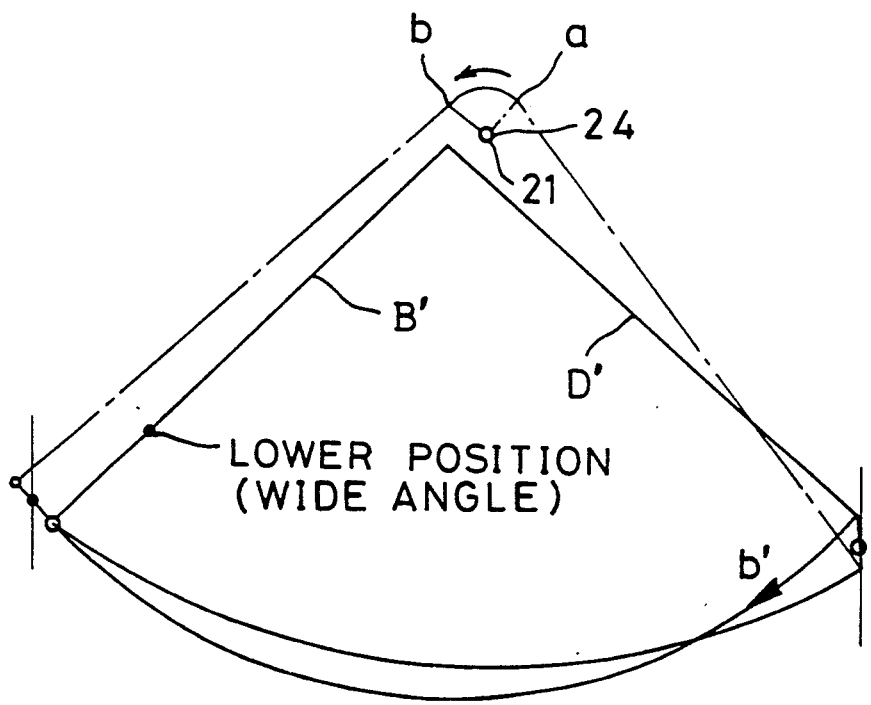
Figure 29:
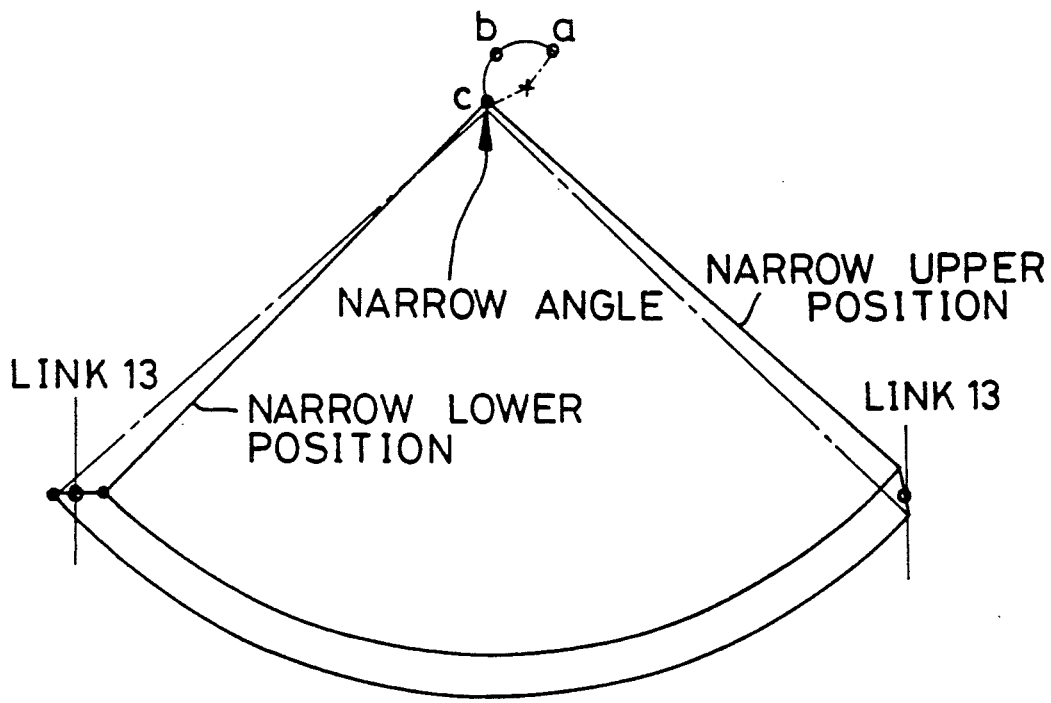
Figure 30:
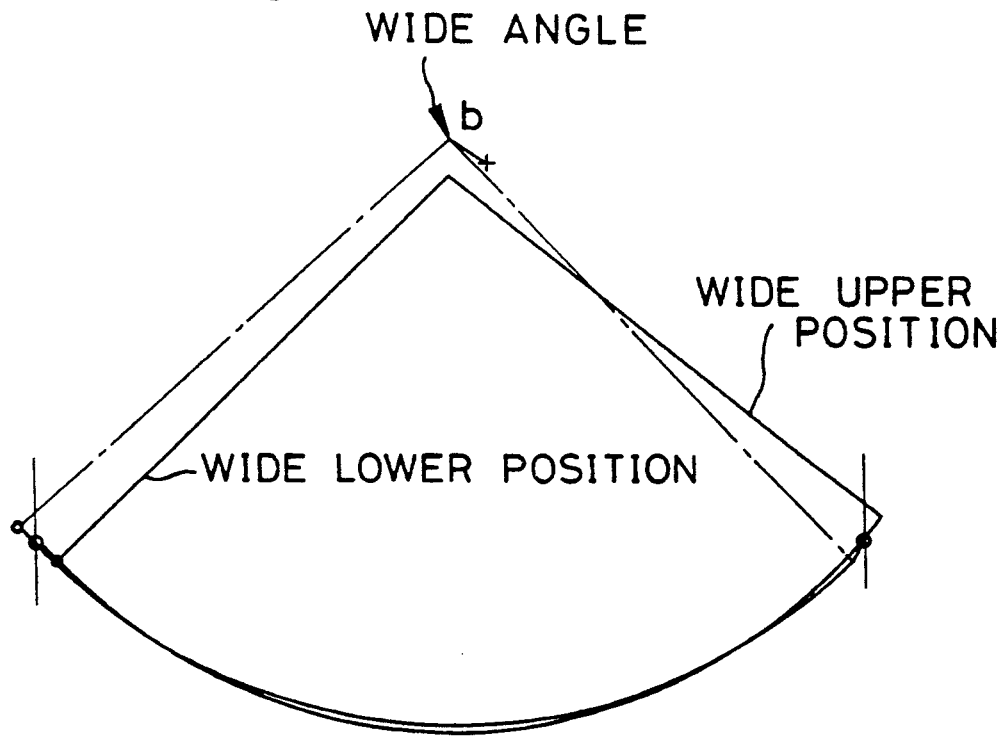
Figure 31:
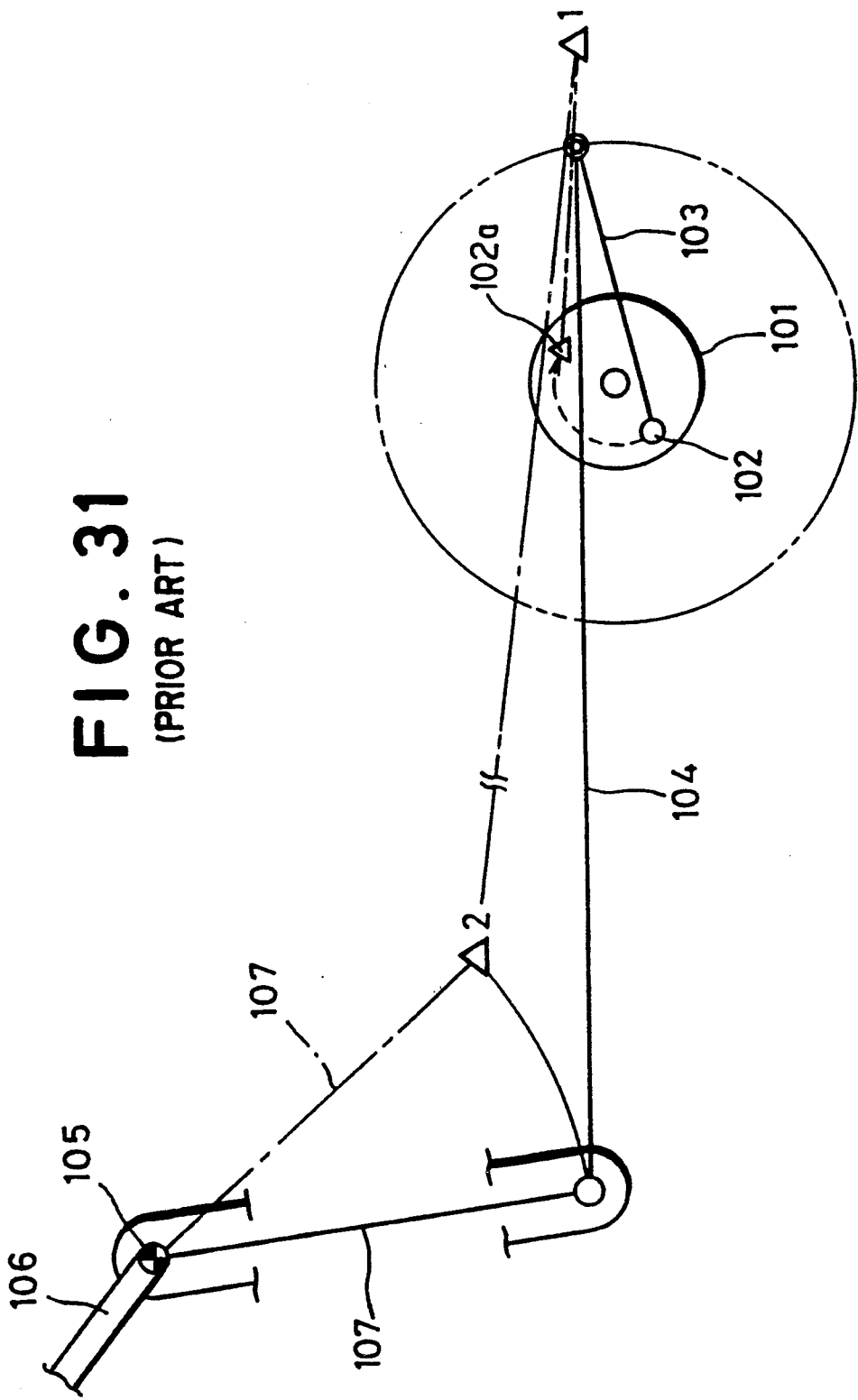

The operation of the wiper structure in accordance with the present invention will now be described with reference to FIGS. 27 through 30. The description will be made with reference to the structure shown in FIGS. 10 and 11. FIG. 27 shows the positions of the main lever 9, the connecting link 25 and the actuating rod 13 in the park position. In the park position, the center of the cam 24 is located as shown by a in FIG. 27 with respect to the center of the worm wheel 21. When the wiper actuating mechanism is operated with this position, the main lever 9 is swung counterclockwise about the axis of the pin 2 as shown by an arrow a' until it reaches the position corresponding to the smaller upper stroke end C'. In the return stroke, the main lever 9 is swung clockwise as shown by an arrow b' in FIG. 28. In this return stroke, the motor 22 is operated to shift the center of the cam 24 from the position a to the position b as shown in FIG. 28 before the main lever 9 reaches the position corresponding to the lower stroke limit B'. In the case where the upper stroke limit is to be determined at D' as in a high vehicle speed operation or a high wiper speed operation, the motor 22 is further operated while the main lever 9 is being moved counterclockwise from the position corresponding to the lower stroke limit B' so that the center of the cam 24 is shifted to the position as shown by c in FIG. 29 before the main lever 9 reaches the upper stroke limit D'. As the result, the wiper blades 5 and 6 are reciprocated between the stroke limits B' and D'.

In the case where the vehicle is running at a low speed or the wiper is being operated at a low speed, the center of the cam 24 is positioned at b as shown in FIG. 28 and the wiper is operated. Then, the wiper blades 5 and 6 are reciprocated between the stroke limits B' and C'.

In an alternative operation, the center of the cam 24 may be shifted from the position a to the position b when the main lever 9 is moved from the park position to the lower stroke limit B'. Then, the center of the cam 24 may be shifted from the position b to the position c to determine the upper stroke limit D' for a narrower wiper stroke. When desired, the motor 22 may be operated to shift the center of the cam 24 to the position b to obtain the upper stroke limit B for a wider wiper stroke. It is preferable to operate the wiper with a narrower stroke at the start of the the operation because the wiper blades will not reach a dangerous positions even when the wiper is started to be operated under a high speed vehicle operation.

The invention has thus been shown and described with reference to specific embodiments, however, it should be noted that the invention is in no way limited to the details of the illustrated structures but changes and modifications may be made without departing from the scope of the appended claims.

We claim:

1. A windshield wiper drive mechanism for a vehicle body having wiper arm means mounted on a stationary part of the vehicle body for reciprocating swinging movement about a fixed pivot axis, said drive mechanism comprising: wiper actuating means connected with the wiper arm means at a point spaced from said fixed pivot axis to cause the reciprocating swinging movement of the wiper arm means, wiper stroke adjusting means for adjusting the distance between said fixed pivot axis and said point of actuating means connection with the wiper arm means, stroke changing means for controlling said wiper stroke adjusting means, said stroke changing means including pivoted means supported for pivotal movement about said fixed axis by said stationary part of the vehicle body, said wiper stroke adjusting means including eccentric means pivotally supported on the wiper arm means, said pivoted means being connected to the eccentric means to pivot the eccentric means with respect to the wiper arm means to change the position of said point of actuating means connection with said wiper arm means, and motor means for moving said pivoted means.

2. A windshield wiper drive mechanism for a vehicle body having wiper arm means mounted on a stationary part of the vehicle part for reciprocating swinging movement about a fixed pivot axis, said drive mechanism comprising: wiper actuating means connected with the wiper arm means at a point spaced from said fixed pivot axis to cause the reciprocating swinging movement of the wiper arm means, wiper stroke adjusting means for adjusting the distance between said fixed pivot axis and said point of actuating means connection with the wiper arm means, and stroke changing means for controlling said wiper stroke adjusting means, said stroke changing means including pivoted means supported for pivotal movement about said fixed axis by said stationary part of the vehicle body, said wiper stroke adjusting means including eccentric means pivotally supported on the wiper arm means, said pivoted means being connected to the eccentric means to pivot the eccentric means with respect to the wiper arm means to change the position of said point of actuating means connection with said wiper arm means, said wiper stroke adjusting means including a lever on said eccentric means and a connecting link to connect said pivoted means and said lever.

3. A variable stroke drive mechanism for a vehicle windshield paper, said mechanism comprising: main lever means, wiper actuating means, connecting means for connecting said main lever means and said wiper actuating means, said connecting means including first pin means, wiper arm means, second pin means for pivotally supporting said main lever means and said wiper arm means, said wiper actuating means including means for driving said main lever means to swing about said second pin means, said connecting means further including first eccentric means pivoted about said first pin means and connected with said wiper actuating means so that rotation of said first eccentric means causes a change in the distance between said second pin means and the connection between said main lever and said wiper actuating means, second eccentric means provided about said second pin means, interconnecting means for connecting said first and second eccentric means, and stroke adjusting means for effecting a rotation of said second eccentric means.

4. A wiper drive mechanism in accordance with claim 3 in which said second pin means is carried by a stationary part of a vehicle body, said stroke adjusting means including worm means having a worm wheel rotatable with said second eccentric means.

5. A wiper drive mechanism in accordance with claim 3 in which said second eccentric means is carried rotatably by a stationary part of a vehicle body.

6. A wiper drive mechanism in accordance with claim 3 in which said second pin means is supported by a hollow member provided on a stationary part of a vehicle body, said stroke adjusting means including gear means carried by said hollow member, said second eccentric means being offset with respect to said gear means, said interconnecting means being swingably connected with said second eccentric means.

7. A wiper drive mechanism in accordance with claim 3 in which said stroke adjusting means includes gear means which is offset with respect to said second pin means, said second eccentric means being offset with respect to said gear means.

8. A wiper drive mechanism in accordance with claim 3 in which said first eccentric means includes an eccentric portion offset with respect to said first pin means, said interconnecting means being connected with said first eccentric means at said eccentric portion, said wiper actuating means being connected with said first eccentric means at a position offset from said first pin means.

9. A wiper drive mechanism in accordance with claim 3 in which said first eccentric means includes an eccentric portion which is offset with respect to said first pin means, said interconnecting means being connected with said eccentric portion.

10. A wiper drive mechanism in accordance with claim 3 in which said first eccentric means is carried by said first pin means and has an eccentric portion offset with respect to said first pin means, said eccentric portion being connected with said wiper actuating means, said first pin means being passed through said eccentric portion.

11. A wiper structure in accordance with claim 4 in which said worm wheel and said second eccentric means are formed as an integral part.

12. A wiper drive mechanism in accordance with claim 1 in which said eccentric means is carried by said pivoted means and wherein said wiper stroke adjusting means further includes a link connecting said eccentric means and said point of actuating means connection with said wiper arm means.

* * * * *

UNITED STATES PATENT AND TRADEMARK OFFICE
CERTIFICATE OF CORRECTION

PATENT NO. : 5,142,728

DATED : September 1, 1992

INVENTOR(S) : Tokihiko Yamamoto et al.

It is certified that error appears in the above-identified patent and that said Letters Patent is hereby corrected as shown below:

Claim 3, column 7, line 48, "paper" should read --wiper--.

Signed and Sealed this

Fourteenth Day of September, 1993

Attest:

BRUCE LEHMAN

*Attesting Officer*  *Commissioner of Patents and Trademarks*